United States Patent [19]

Kudo et al.

[11] 4,137,339

[45] Jan. 30, 1979

[54] METHOD OF PREPARING PROCESSED FOOD MATERIAL FROM SOYBEAN

[75] Inventors: Shiro Kudo, Ito; Keizo Ishino, Iida; Yoshinori Takashima, Komagane, all of Japan

[73] Assignee: Asahimatsu Koridofu Kabushiki Kaisha, Nagano, Japan

[21] Appl. No.: 828,749

[22] Filed: Aug. 29, 1977

[30] Foreign Application Priority Data

Jan. 25, 1977 [JP] Japan ..................................... 52/7033

[51] Int. Cl.² ............................. A23L 1/20; A23J 3/00
[52] U.S. Cl. ..................................... 426/634; 426/656; 426/385; 426/507; 426/511; 426/459
[58] Field of Search ................. 426/46, 598, 634, 656, 426/385, 507, 511, 459; 260/123.5, 112 R

[56] References Cited

U.S. PATENT DOCUMENTS

| | | | |
|---|---|---|---|
| 3,647,484 | 3/1972 | Yokotsuka et al. | 426/46 X |
| 3,764,708 | 10/1973 | Aonuma et al. | 426/46 |
| 3,901,978 | 8/1975 | Nelson et al. | 426/598 X |

*Primary Examiner*—Robert A. Yoncoskie
*Attorney, Agent, or Firm*—Toren, McGeady and Stanger

[57] ABSTRACT

A method of preparing a processed food material from soybean comprising soaking whole grains of soybean in water, heating the grains at 80 – 200° C with superheated steam for less than a minute to deactivate the physiologically active substances in the soybean, crushing the grains thus treated with water followed by further subdividing into finer particles with a homogenizer to completely destroy the soybean cells, and adding a protein coagulating agent to precipitate the protein together with fat and fibrin.

6 Claims, No Drawings

METHOD OF PREPARING PROCESSED FOOD MATERIAL FROM SOYBEAN

FIELD OF THE INVENTION

The present invention relates to a method for preparing a processed food material from soybean which tastes good, has no soybean odor, and is smooth in mouth.

BACKGROUND OF THE INVENTION

Soybean contains an enzyme which, on being activated, reacts with oil in the soybean grain. The reaction product causes the soybean odor.

Soybean also contains tripsin-inhibiting substances and oligosaccharides, which may lead to a flatulence.

For this reason, soybean is not a preferred food in the world except in the Far East.

SUMMARY OF THE INVENTION

The present inventors have attempted to eliminate these disadvantages of soybean as a food, and have created a method with which to efficiently remove these drawbacks.

Thus, the present inventors have invented a process for efficiently converting soybean into a processed food material. The features of the present invention lie in the method of preparing a processed food material from soybean comprising soaking whole grains of soybean in water, heating the grains at 80 - 200° C with superheated steam for less than a minute to deactivate the physiologically active substances in the soybean, crushing in cold or hot water followed by further subdividing into finer particles with a homogenizer to completely destroy the soybean cells, adding a protein coagulating agent, such as, acid and salts of calcium to precipitate the protein together with fat and fibrin, the mixture being either curded to obtain a pasty product or dehydrated by freezing or heating to obtain a dried powdery product.

DETAILED DESCRIPTION OF THE INVENTION

According to the present invention, soaked grains of soybean are treated in a high pressure tank by introducing steam at high temperature and high pressure, for example at 165° C and 6 kg/cm$^2$, for less than a minute. In this treatment the enzyme and the tripsin-inhibiting substances are denatured to deactivation, which is useful to remove the source of soybean odor, as well as to soften the skin of the beans. But, if the heating at a high temperature under a high pressure continues for more than a minute, the beans take on the smell and taste of boiled beans which is not favorable. Therefore the grains of soybean treated at a high temperature and pressure for a short time, are removed from the tank and then cooled in water. This treatment serves to avoid the boiled bean smell and taste.

Next, the grains of soybean are divided into finer pieces.

From the crushed soybean grains the outer skins and cell membranes are separated from the soybean milk by filtration or any other suitable method, forming a solid residue called "okara".

When soybean curd, which is called "tofu" or frozen dried soybean curd is prepared, the amount of the components utilized remains less than 50% of the total soybean grains, and the solid residue contains more than 20% of the protein and more than 6% of the fat oil. To improve the yield of protein, fat, and oil, the solid residue is further crushed in cold or hot water and then subdivided with a homogenizer under a high pressure greater than 100 kg/cm$^2$ to destroy any cells remaining in the residue.

This treatment gives a stable colloidal liquid of soybean in which the cells are broken and the cell membranes are divided into tiny particles. However, oligosaccharides in the soybean are dissolved in the liquid, which may cause flatulence. To remove the oligosaccharides, a coagulating agent selected from the group consisting of edible acids, such as, lactic, citric, malic, and phosphoric acids or salts thereof, salts of calcium or magnesium, such as, calcium chloride, magnesium chloride, calcium sulfate, magnesium sulfate, or other coagulating agents, such as, glucono-δ-lactone are added, to coagulate the protein leaving the oligosaccharides in the supernatant liquid which is removed as a waste.

The coagulated matter thus obtained is then optionally washed with water and utilized as a processed food material. The water content may be reduced if necessary.

If a product of lower water content is desired, dehydration by means of freeze drying or heating is feasible. The product is free from the soybean odor, contains no physiologically interfering material, and has good taste. It may be utilized in a variety of uses including food processes in the agriculture, fishery, cattle breeding, and dairy areas.

DESCRIPTION OF PREFERRED EMBODIMENTS

EXAMPLE 1

One kilogram of soybean grains was washed with water and soaked for 16 hours in water at room temperature to yield about 2.3 kg of swollen soybean grains. The soybean was then placed in a high pressure tank, to which high pressure steam at 6 kg/cm$^2$ (by gauge) was introduced and the drains as well as most of the air inside the tank were removed. The inside pressure was then raised to 6 kg/cm$^2$ (by gauge) with the valve closed, and the pressure was maintained for 30 seconds. Then the steam was stopped and the pressure released, and the soybean was taken out and cooled. Water was removed from the soybean grains which were crushed together with 6 kg of cold or hot water into small granules of less than 0.5 mm diameter. A slurry produced by the crushing was homogenized by one or more treatments in a high pressure homogenizer (Manton-Gaulin Co.) under a pressure exceeding 100 kg/cm$^2$, to destroy the tissues of soybean. In this treatment cells were broken and the extraction became more complete. The liquid was heated to 75° C, and calcium chloride was added under stirring until a concentration of 0.02 N was reached, to coagulate protein which was then transferred into a frame to make curd from it. The supernatant liquid was removed and the curd was washed with water. Otherwise the coagulum was filtered off with a filtering cloth and further dried by centrifugation with a basket type centrifuge. The yield was about 2.3 kg of coagulum of protein containing 65% of water. This was a processed food material produced from soybean which was free from soybean odor and tasted good. The processed food material could be eaten without further treatment. However, when it was ground with a colloid mill, a pasty product having a fine texture and smooth touch was obtained, of which the composition is as follows:

| Component | Water | Protein | Fats | Saccharides | Fibrins | Ash |
|---|---|---|---|---|---|---|
| Content (%) | 65.0 | 18.8 | 11.0 | 0.1 | 2.5 | 2.6 |

EXAMPLE 2

Grains of soybean in the amount of 1 kg was washed and soaked in 40° C water for 6 hours, producing about 2.3 kg of soybean. This was then treated for 10 seconds with steam which was at about 200° C and at a pressure of 8 kg/cm² (by gauge) to deactivate interfering enzymes, and then cooled. The entire amount of the soybean was ground with a colloid mill together with 6 kg of hot water. The obtained slurry was made into finer particles using the same high pressure homogenizer as used in Example 1 with a pressure exceeding 100 kg/cm² (by gauge), preferably in the range 300 to 500 kg/cm². The desirable particle size is less than 50 micron. The homogenized liquid was kept at 70° C and citric acid was added to adjust the pH to 4.5 to 5.0, to acid-coagulate the protein which, after filtration, was pressed to obtain about 2.7 kg of coagulum having a water content of about 70%. The coagulum was frozen overnight at −10° C to bring about freezing denaturation, and water was removed from the coagulum by pressing it after defreezing. By this treatment about 1.6 kg of a coagulum was obtained, of which the contents were as follows:

| Component | Water | Protein | Fats | Saccharides | Fibrins | Ash |
|---|---|---|---|---|---|---|
| Content (%) | 50.0 | 26.9 | 15.7 | 0.2 | 3.6 | 3.6 |

EXAMPLE 3

A liquid containing very fine particles produced in the same process as in Examples 1 and 2 from whole grains of soybean was kept at 37° C, to which about 2% of a starter was added. The starter is selected from the group consisting of lactobacillus vulgaris, lactobacillus thermophyllus, and streptococcus lactis which were cultured as starter for the lactic acid fermentation. Lactic acid was formed during a 4 to 6 hour standing period. Coagulation followed and the coagulum was broken into pieces as large as soybean grains. Water was removed from the grains by mere standing or pressing, to reduce the water content below 65%. This was ground with a colloid mill. Otherwise removal of water was effected by freezing denaturation, and a paste was produced by kneading with a kneader. This paste was dried into a powder by blowing with hot air or by spraying. The components and their contents in the dried product were as follows:

| Component | Water | Protein | Fats | Saccharides | Fibrins | Ash |
|---|---|---|---|---|---|---|
| Content (%) | 4.0 | 51.6 | 30.0 | 0.4 | 6.9 | 7.0 |

What is claimed is:

1. A method of preparing a food material from soybean comprising swelling the beans by soaking whole grains of soybean in water, heating the swollen grains at 80 to 200° C with superheated steam for less than a minute to deactivate the enzyme and tripsin inhibiting substances therein, crushing the grains thus treated in sufficient amount of water to dissolve flatulence producing saccharides followed by further subdividing into finer particles with a homogenizer to completely destroy the soybean cells and adding a protein coagulating agent in amounts sufficient to precipitate the protein together with fat and fibrin.

2. A method according to claim 1 which further comprises curding the mixed precipitate to obtain a pasty product.

3. A method according to claim 1 which further comprises dehydrating the mixed precipitate to obtain a dried powdery product.

4. A method according to claim 1 in which the protein coagulating agent is one selected from the group consisting of edible acids, salts thereof, and salts of calcium or manganese.

5. A method according to claim 3 in which the dehydration is effected by freeze drying.

6. A method according to claim 3 in which the dehydration is effected by heating.

* * * * *